United States Patent
Vialle

(10) Patent No.: US 8,027,772 B2
(45) Date of Patent: Sep. 27, 2011

(54) POWER TRANSMISSION GEARBOX PRESENTING A MODIFIABLE SPEED OF ROTATION AT ITS OUTLET, AND A CORRESPONDING METHOD OF OPERATION

(75) Inventor: Michel Vialle, Aix en Provence (FR)

(73) Assignee: Eurocopter, Marignane Cedex (FR)

( * ) Notice: Subject to any disclaimer, the term of this patent is extended or adjusted under 35 U.S.C. 154(b) by 430 days.

(21) Appl. No.: 12/393,220

(22) Filed: Feb. 26, 2009

(65) Prior Publication Data

US 2009/0222178 A1 Sep. 3, 2009

(30) Foreign Application Priority Data

Feb. 28, 2008 (FR) ..................................... 08 01112

(51) Int. Cl.
*F16H 37/02* (2006.01)
*B64C 27/12* (2006.01)
*G06F 19/00* (2006.01)

(52) U.S. Cl. .................. 701/54; 701/3; 701/61; 701/67; 416/120; 244/17.11

(58) Field of Classification Search .................. 701/54, 701/53, 61, 67, 3, 55; 416/120, 170 R; 74/665 A; 477/181, 60; 244/17.11
See application file for complete search history.

(56) References Cited

U.S. PATENT DOCUMENTS

| | | | | |
|---|---|---|---|---|
| 3,782,223 A | * | 1/1974 | Watson | ........................ 74/665 L |
| 7,418,888 B2 | | 9/2008 | Vialle | |
| 7,942,365 B2 | * | 5/2011 | Palcic et al. | ................ 244/17.11 |
| 2002/0145076 A1 | * | 10/2002 | Alford | ............................ 244/60 |
| 2006/0269414 A1 | | 11/2006 | Palcic et al. | |

FOREIGN PATENT DOCUMENTS

| | | |
|---|---|---|
| FR | 2869018 | 10/2005 |
| FR | 2871138 | 12/2005 |

OTHER PUBLICATIONS

French Search Report dated Oct. 8, 2008 from corresponding FR Application No. 0801112.

* cited by examiner

*Primary Examiner* — Tan Q Nguyen
(74) *Attorney, Agent, or Firm* — Brooks Kushman P.C.

(57) ABSTRACT

A power transmission gearbox for rotorcraft for transmitting rotary movement from at least two engine members to a main shaft, wherein the gearbox presents at least two transmission systems for imparting rotary movement to the main shaft, each of the transmission systems including: an inlet shaft designed to be driven in rotation by an engine member; at least two reduction stages presenting different reduction ratios; a first gearwheel connected to the inlet shaft via a declutchable freewheel, the gearwheel meshing with a first toothed wheel secured to an intermediate shaft defining at least a first reduction stage; a second gearwheel connected to the inlet shaft via a simple freewheel, the second gearwheel meshing with a second toothed wheel secured to the intermediate shaft defining the second reduction stage; a main freewheel mounted on the intermediate shaft to rotate a complementary toothed wheel secured to the main shaft; and a clutch mechanism for the declutchable freewheel.

12 Claims, 3 Drawing Sheets

POWER TRANSMISSION GEARBOX PRESENTING A MODIFIABLE SPEED OF ROTATION AT ITS OUTLET, AND A CORRESPONDING METHOD OF OPERATION

FIELD OF THE INVENTION

The present invention relates to the general technical field of mechanical transmissions, and more particularly to transmission mechanisms including one or more reduction stages.

More particularly, the present invention relates to power transmission gearboxes, also known as main gearboxes, for rotorcraft, and in particular for helicopters.

BACKGROUND OF THE INVENTION

In the field of rotorcraft, helicopters, or the like, it is common practice to drive a rotor by means of a plurality of engine members, in particular a pair of engine members. The number of such engine members is nevertheless not limiting on the scope of the present invention.

The rotors of a helicopter are driven by engine members via one or more reduction stages that present a constant reduction ratio. This applies to driving the rotary wing, or more precisely the blades.

In the state of the art, systems are known in which one or more speeds of rotation for rotors are accessible for a given speed of rotation for the engine member(s). In order to obtain such a variation in the speed of the rotor, such systems require a corresponding modification to be made to the speed of rotation of the engine member(s), and that generally leads to a temporary loss of torque and power.

Varying the speed of rotation of a known helicopter rotor thus results from causing the speed of rotation of the engine members to vary in a corresponding manner. It is found to be impossible to obtain a large speed difference without loss of torque transmission from the engine members. This constitutes a drawback that is not negligible whether in terms of performance or in terms of safety in the operation of helicopters.

By way of example, document US 2006/0 269 414 discloses a device enabling a variable speed main gearbox to be made that includes freewheels and clutches. Nevertheless, such devices suffer from a certain number of drawbacks. Because of overrunning of their component plates that come into mutual contact, the clutches do not enable the power delivered by an engine member to be transmitted instantaneously. There thus results an instant in which the system for transmitting speed of rotation to the main gearbox (MGB) is interrupted, and the torque that is transmitted is then zero. In addition, the clutches suffer from problems of wear and/or adjustment, that can be harmful to the reliability and the efficiency of devices in which they are incorporated.

OBJECTS AND SUMMARY OF THE INVENTION

Consequently, the objects given to the invention seek to propose a novel power transmission gearbox that does not present the above-mentioned drawbacks and that makes it possible significantly to vary the speed of rotation of the rotor while conserving uninterrupted transmission of torque from the engine members.

Another object of the invention seeks to propose a gearbox that is compact, having component elements that are simple to fabricate, to assemble, and to maintain.

Another object of the invention seeks to propose a power transmission gearbox that delivers different speeds of rotation to the rotor for a common initial speed of rotation of the engine members.

Another object of the invention seeks to propose a power transmission gearbox that does not require complex adjustment operations during assembly and/or use.

Another object of the invention seeks to propose a power transmission gearbox that does not include parts that suffer from early wear or that require frequent inspection and/or replacement.

Another object of the invention seeks to propose a control method that enables the speed of rotation at the outlet from a power transmission gearbox to be modified for a given speed of rotation of the inlet shaft, as determined by the drive members.

Another object of the invention seeks to propose a control method that enables the speed of rotation at the outlet from a power transmission gearbox to be modified while modifying the speed of rotation of the inlet shaft only momentarily during implementation of said method.

The objects given to the invention are achieved with the help of a power transmission gearbox, in particular for rotorcraft, for transmitting rotary movement from at least two engine members to a main shaft with determined reduction ratios, wherein the gearbox presents at least two transmission systems for imparting rotary movement to the main shaft, each of the transmission systems comprising:

an inlet shaft designed to be driven in rotation by an engine member;
at least two reduction stages presenting different reduction ratios;
a first gearwheel connected to the inlet shaft via a declutchable freewheel, said gearwheel meshing with a first toothed wheel secured to an intermediate shaft, thereby defining at least a first reduction stage;
a second gearwheel connected to the inlet shaft via a simple freewheel, said second gearwheel meshing with a second toothed wheel secured to the intermediate shaft, thereby defining the second reduction stage;
a main freewheel mounted on the intermediate shaft to rotate a complementary toothed wheel secured to the main shaft; and
a clutch mechanism for the declutchable freewheel for the purpose, depending on circumstances, of putting the inlet shaft into engagement with said declutchable freewheel or for drivingly isolating the inlet shaft from said declutchable freewheel.

In an embodiment of a twin-engine helicopter each of the transmission systems thus presents two reduction stages, having respective different reduction ratios. The difference between these reduction ratios thus determines the two possible speeds of rotation for the rotor with a given speed of rotation for the engine members.

An advantage associated with a gearbox in accordance with the invention lies in obtaining a large variation in the speeds of rotation of the rotor. The invention thus makes it possible to vary the speed of rotation in proportions going beyond that possible given the speed ranges over which the engines can be regulated.

Another advantage provided by a gearbox in accordance with the invention lies in the fact that there is no loss of power when changing from one speed (or gear) to another.

Another advantage obtained by the present invention is that the main gearbox (MGB) has a small number of component elements, consequently reducing its weight.

Another advantage of the invention results from using means that are simple. The invention relies on the difference in reduction ratio pairs of gears and on the difference in speed between two engines in order to enable the clutch mechanism to be put into a clutched or declutched state.

Another advantage is associated with the possibility of the present invention being implemented for different types of rotorcraft, and in particular for a three-engined helicopter.

The term "clutch mechanism" is used to mean any system enabling a freewheel to be put in a (clutched) state in which it engages the shaft on which it is mounted, or to be put into a state in which it is drivingly isolated from said shaft (declutched). When declutched, the shaft can no longer, on rotating, drive the freewheel. An example of a clutch mechanism that is already known, and also of its operation, can be found in document FR 2 871 138.

When a wheel or gearwheel is said to be secured to a shaft, it should be understood that said wheel or gearwheel rotates with said shaft and is intimately secured thereto.

In an embodiment in accordance with the invention, the clutch mechanism is mounted on the inlet shaft.

By way of example, the clutch mechanism is actuated by means of a hydraulic actuator. The operation of the hydraulic actuator is advantageously controlled by electrical or electronic means that are known and not described in the present description.

In an embodiment, the clutch mechanism comprises a mechanism for engaging and disengaging the inlet shaft with an outlet shaft that is coaxial with said inlet shaft over at least a portion of its length.

By way of example, the main shaft serves to rotate a rotary wing or a rotor supporting blades.

In an embodiment in accordance with the invention, each transmission system has n reduction stages, one simple freewheel, one main freewheel, and n−1 declutchable freewheels, where n is the number of available speeds, i.e. an integer greater than or equal to 2.

When n=2, it is possible to envisage placing two distinct drive systems in each transmission system, the drive systems having different reduction ratios, thereby defining two speeds of rotation that are available for the rotor with a given speed of rotation of the engine members.

The objects given to the invention are also achieved with the help of a control method for modifying the speed of rotation of a main shaft of a power transmission gearbox, the method consisting in:

j1) reducing the speed of rotation of the left engine member to a value Ne1, starting from a value Ne, while conserving the value Ne for the speed of rotation of the right engine member;

j2) declutching the declutchable freewheel of the left transmission system;

j3) increasing the speed of rotation of the left engine member to the value Ne and keeping said speed of rotation constant;

j4) decreasing the speed of rotation of the right engine member to a value less than Ne, e.g. equal to Ne1;

j5) declutching the declutchable freewheel of the right transmission system; and j6) increasing the speed of rotation of the right engine member to the value Ne.

The objects given to the invention are also achieved with the help of a control method for modifying the speed of rotation of a main shaft of a power transmission gearbox, the method consisting in:

i1) reducing the speed of rotation of the left engine member to a value Ne1, starting from a value Ne, while conserving the value Ne for the speed of rotation of the right engine member;

i2) declutching the declutchable freewheel of the left transmission system;

i3) increasing the speed of rotation of the left engine member to a value Ne2, greater than the value Ne;

i4) declutching the declutchable freewheel of the right transmission system; and i5) decreasing the speed of rotation of the left engine member to the value Ne.

The control method in accordance with the invention presents the advantage of being extremely simple to implement insofar as it is based mainly on speed differentials between elements of a left transmission system and a right transmission system.

Another advantage of the invention lies in the operation of the engine members that conserve a constant speed of rotation or that return to their initial speed of rotation after the end of the successive phases for modifying the speed of rotation of the main shaft.

In an implementation in accordance with the invention, the control method consists in implementing the steps j1) to j6) or i1) to i5) with the help of a computer.

The objects given to the invention are also achieved with the help of an engine assembly for a rotorcraft, of the helicopter kind, the assembly comprising a power transmission gearbox as presented above, together with a distinct engine of the turbine engine or piston engine kind associated with each of the transmission systems.

The objects given to the invention are also achieved with the help of a helicopter or a rotorcraft that includes a power transmission gearbox as presented above.

BRIEF DESCRIPTION OF THE DRAWINGS

Other features and advantages of the invention appear in greater detail on reading the following description and with the help of the accompanying drawings, given purely by way of non-limiting illustration, and in which.

MORE DETAILED DESCRIPTION

Figure 1:
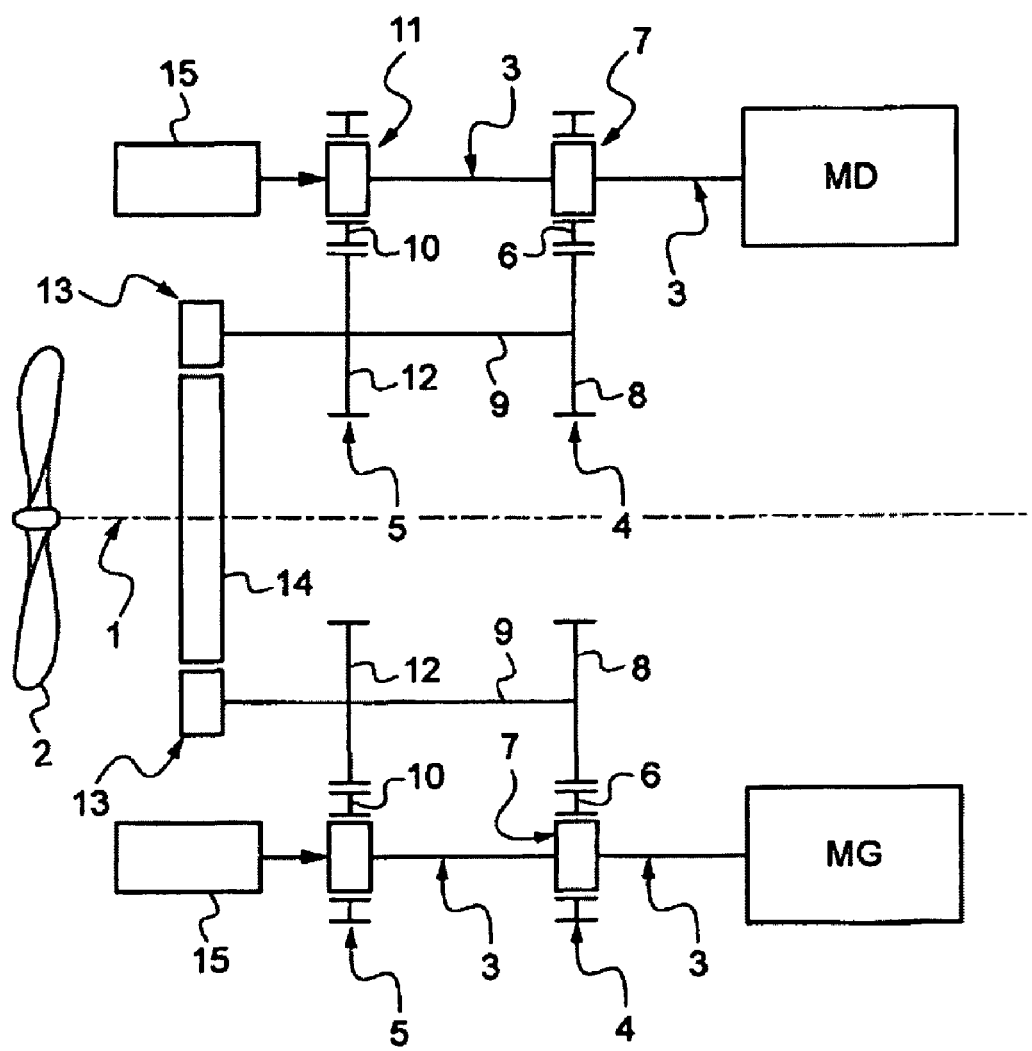
FIG. 1 is a diagram of an embodiment of a power transmission gearbox in accordance with the invention.

FIG. 1 is a diagram showing the arrangement of a power transmission gearbox in accordance with the invention between engine members MG and MD, and a main shaft 1 driving a rotor (not shown) or blades 2.

The example shown comprises two transmission systems each associated with one of the engines MG or MD. The gearbox as shown diagrammatically in this way is intended for example for a two-engined helicopter with the engine members MG and MD being of the gas turbine or piston engine kind.

The gearbox thus has two transmission systems, a left system G and a right system D, each incorporating reduction stages 4 and 5.

Each of the transmission systems comprises an inlet shaft 3 designed to be driven by the corresponding engine member MG or MD.

Each of the transmission systems has two reduction stages 4 and 5, and the stages present respective different reduction ratios k1 and k2.

Each of the transmission systems also includes a first gearwheel 6 connected to the inlet shaft 3 via a declutchable freewheel 7. The first gearwheel 6 meshes with a first toothed wheel 8 secured to an intermediate shaft 9, thus defining the first reduction stage 4.

A second gearwheel 10 is connected to the inlet shaft 3 via a simple freewheel 11. The second gearwheel 10 meshes with a second toothed wheel 12, secured to the intermediate shaft 9, thereby defining the second reduction stage 5.

A main freewheel 13 mounted on the intermediate shaft 9 is designed to rotate a complementary toothed wheel 14 secured to the main shaft 1.

Each of the transmission systems also includes a clutch mechanism for the declutchable freewheel 7 so as to cause the inlet shaft 3 to engage with said declutchable freewheel 7 or else to isolate the inlet shaft 3 drivingly from said declutchable freewheel 7.

A clutch mechanism (not shown) is advantageously mounted on the inlet shaft 3. The clutch mechanisms is preferably actuated via a hydraulic actuator 15. The clutch mechanism comprises a mechanism for interconnecting and disconnecting the inlet shaft 3 and an outlet shaft that is coaxial with said inlet shaft 3 over at least a fraction of its length.

By way of example, the main shaft 1 is for rotating the blade 2 of a rotor, or those of a rotary wing (not shown).

In the description below, the component elements of the two transmission systems are distinguished by adding the term "left" or "right" depending on whether they belong to the transmission system shown in the top portion or in the bottom portion of FIG. 1. The same applies to the other component elements of the transmission systems. Where appropriate, these elements are likewise given a reference G (for "gauche"=left) or D (for "droite"=right). One of the transmission systems is thus associated with the right engine member MD and the other transmission system (in the bottom portion) is associated with the left engine member MG.

The operation of the power transmission gearbox in accordance with the invention is described below in greater detail. This operation is illustrated as a succession of operating phases corresponding to operating states of the various component elements of the power transmission gearbox. Implementing all of these operating phases enables the speed of rotation of the rotor (main shaft) to be varied in accordance with the invention and this is described below with reference to the steps of a control method.

The description below is based on FIGS. 2 and 3, and the operating states of the freewheels are identified therein as follows:

DC for a freewheel that is declutched;
GL for a freewheel that is overrunning;
E1 for the driving freewheel transmitting power Pa;
E2 for the driving freewheel transmitting power 2Pa.

During the first phase ph1, both engine members MG and MD rotate at identical speeds of rotation Ne and drive the main shaft 1 at an initial speed Nr. Each of the engine members MG and MD transmit identical power via the corresponding first reduction stage 4 to the main shaft 1, and this power is equal to Pa.

The rotor that is secured to the main shaft 1 is driven in rotation by both the left and the right drive systems G and D each comprising its first gearwheel 6, its toothed wheel 8, and its declutchable freewheel 7. The freewheel 7 is in a state in which it is clutched to the inlet shaft 3, and the simple freewheel 11 overruns on the inlet shaft 3 by virtue of the second reduction stage 5 having an appropriate reduction ratio k2 relative to the first reduction stage 4. The reduction ratio k1 is applied to the intermediate shaft 9. When in a driving state, the second reduction stage 5 serves to deliver a speed of rotation to the intermediate shaft 9 that is smaller than the speed delivered by the first reduction stage 4, assuming that the engine members MD and MG are rotating at identical speeds of rotation Ne. The declutchable freewheels 7 are in a driven state E1 and the simple freewheels 11 are in an overrunning state GL.

During the second operating phase ph2, the speed of rotation of the left engine member MG decreases and the power 2Pa required by the rotor is transmitted entirely via the right engine member MD and the first reduction stage 4. This is because the left declutchable freewheel 7 starts to overrun on the inlet shaft 3.

Step i1) of the control method thus consists in reducing the speed of rotation of the left engine member MG from Ne to a value Ne1, while conserving the value Ne for the speed of rotation of the right engine member MD. The operating state of the left declutchable freewheel 7 is thus transformed into an overrunning state GL.

The left transmission system G is thus unloaded and action of the left hydraulic actuator 15 enables the left declutchable freewheel 7 to be declutched. This freewheel is then drivingly isolated from the inlet shaft 3. Step i2) thus consists in declutching (DC1) the declutchable freewheel 7 of the left transmission system G. The left declutchable freewheel 7 is consequently in a declutched operating state DC during the third operating phase ph3.

During the fourth operating phase ph4, the speed of rotation of the left drive member MG increases back up to the value Ne. The operating states of the freewheels remain unchanged.

During the fifth operating phase ph5, the speed of rotation of the left engine member MG increases up to a value Ne2. During this phase ph5, as soon as a value Ne+x % is reached, which value is greater than Ne and less than Ne2, the right declutchable freewheel 7 passes to an overrunning operating state GL, and the left simple freewheel 11 passes to a driving operating state E2 so as to transmit all of the power 2Pa via the left engine member MG and the second reduction stage 5, while the right transmission system D is unloaded. The active drive system is the left system including in particular the left second gearwheel 10, the left second toothed wheel 12, and the left simple freewheel 11, corresponding to the left second reduction stage 5. Step i3) thus consists in increasing the speed of rotation of the left engine member MG to the value Ne2 that is greater than Ne.

The difference between the values Ne+x % and Ne2 serves to ensure a speed difference that is sufficient to enable the hydraulic actuator 15 to declutch the right declutchable freewheel 7 (DC2) during the sixth operating phase ph6. In particular, during this phase ph6, the speed of rotation Nr of the rotor is raised to a value Nr1 that is greater than Nr. The operating states of the freewheels remain unchanged. Step i4) thus consists in declutching the declutchable freewheel 7 of the right transmission system D. The right declutchable freewheel 7 thus takes up a declutched operating state DC, illustrative of the seventh operating phase ph7.

The amount by which the speed of rotation of the left engine member MG increases is identical to the amount by which the speed of rotation of the intermediate shaft 9 increases, and consequently to the rate at which the speed of rotation of the rotor increases under drive from the second reduction stage 5 increases. In the present example, k2 is greater than k1.

Thereafter, the speed of rotation of the left engine member MG decreases during an operating phase ph8 so as to return to its initial value Ne in an operating phase ph9, thereby enabling the right simple freewheel 11 to be driven by the inlet shaft 3. Step i5) thus consists in decreasing the speed of rotation of the left engine member MG to the value Ne during phase ph8. During this phase ph8, the speed of rotation of the rotor goes from a value Nr1 to a value Nr2 that is less than Nr1 and that is determined by the reduction ratio k2 of the second reduction stage 5.

Both left and right engine members MG and MD then transmit equal power Pa to the rotor, with this being done via the respective second reduction stages 5.

Both engine members MG and MD are again rotating at their initial speed of rotation Ne and the intermediate shafts 9 are rotating at a speed that is determined by the gear ratio k2 of the second reduction stages 5, corresponding to the right and left second drive systems.

By going from phase ph8 to phase ph9, the operating states of the right and left simple freewheels 11 pass respectively from an overrunning state GL to a driving state E1 and from a driving state E2 to a driving state E1.

The successive steps of the control method as presented above can be implemented in the opposite order, without going beyond the ambit of the present invention, in order to return the rotor to its initial speed Nr.

Figure 3:
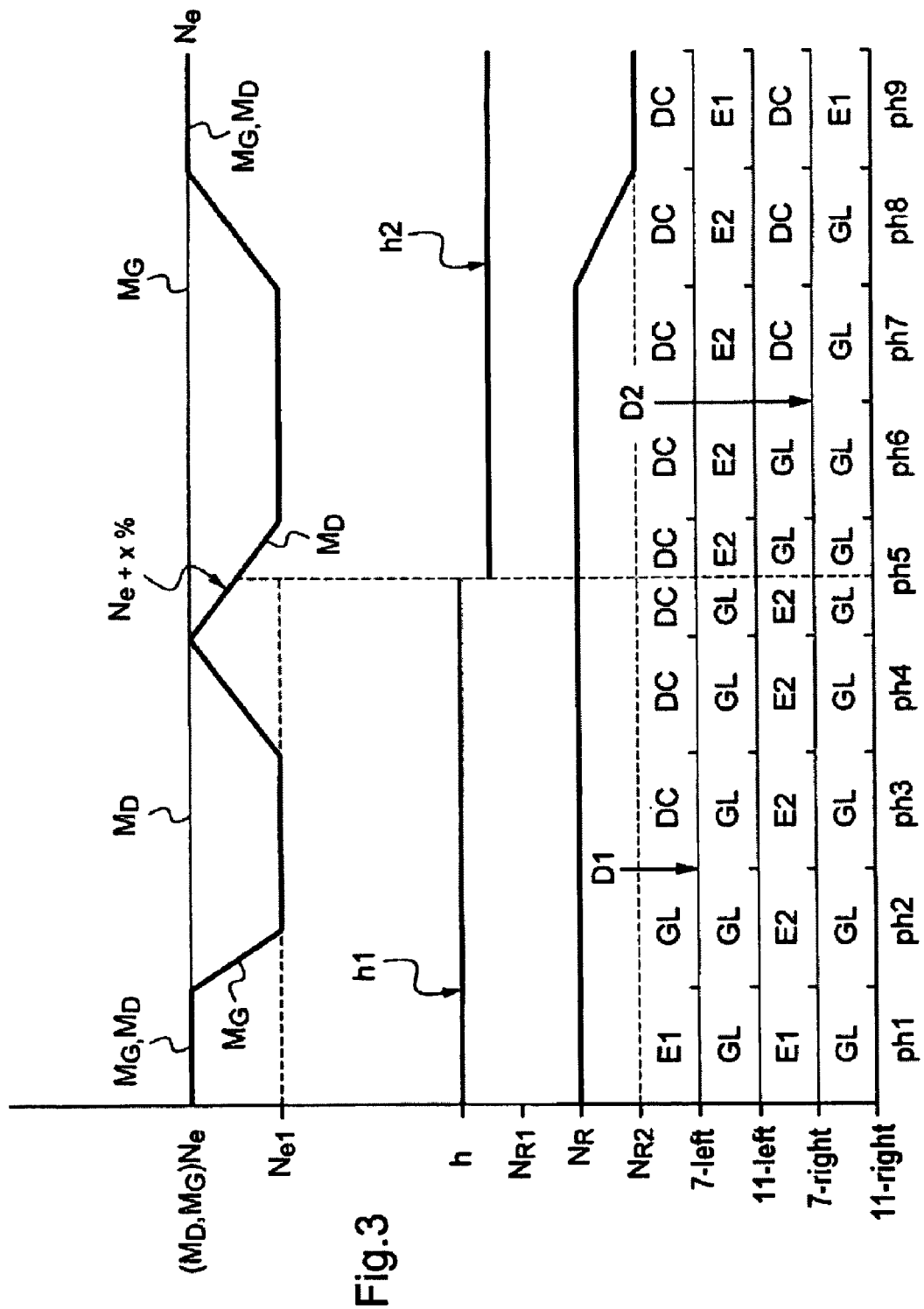
FIG. 3 is a diagram showing firstly the various phases of another implementation of the control method in accordance with the invention, enabling the speed of rotation of the main shaft of a power transmission gearbox in accordance with the invention to be changed, and secondly the various operating states of the freewheels of each of each transmission system during said phases.

A variant implementation of the control method in accordance with the invention is shown in FIG. 3. Steps j1) and j2) are identical to steps i1) and i2) Steps j3) to j6) replace steps i3) to i5).

Step j3) consists in increasing the speed of rotation of the left engine member MG up to a value Ne and in maintaining said speed of rotation constant.

Step j4) consists in reducing the speed of rotation of the right engine member MD to a value that is less than Ne, e.g. equal to Ne1.

Step j5) consists in declutching (DC2) the declutchable freewheel 7 of the right transmission system D, and step j6) consists in increasing the speed of rotation of the right engine member MD up to the value Ne.

Figure 2:
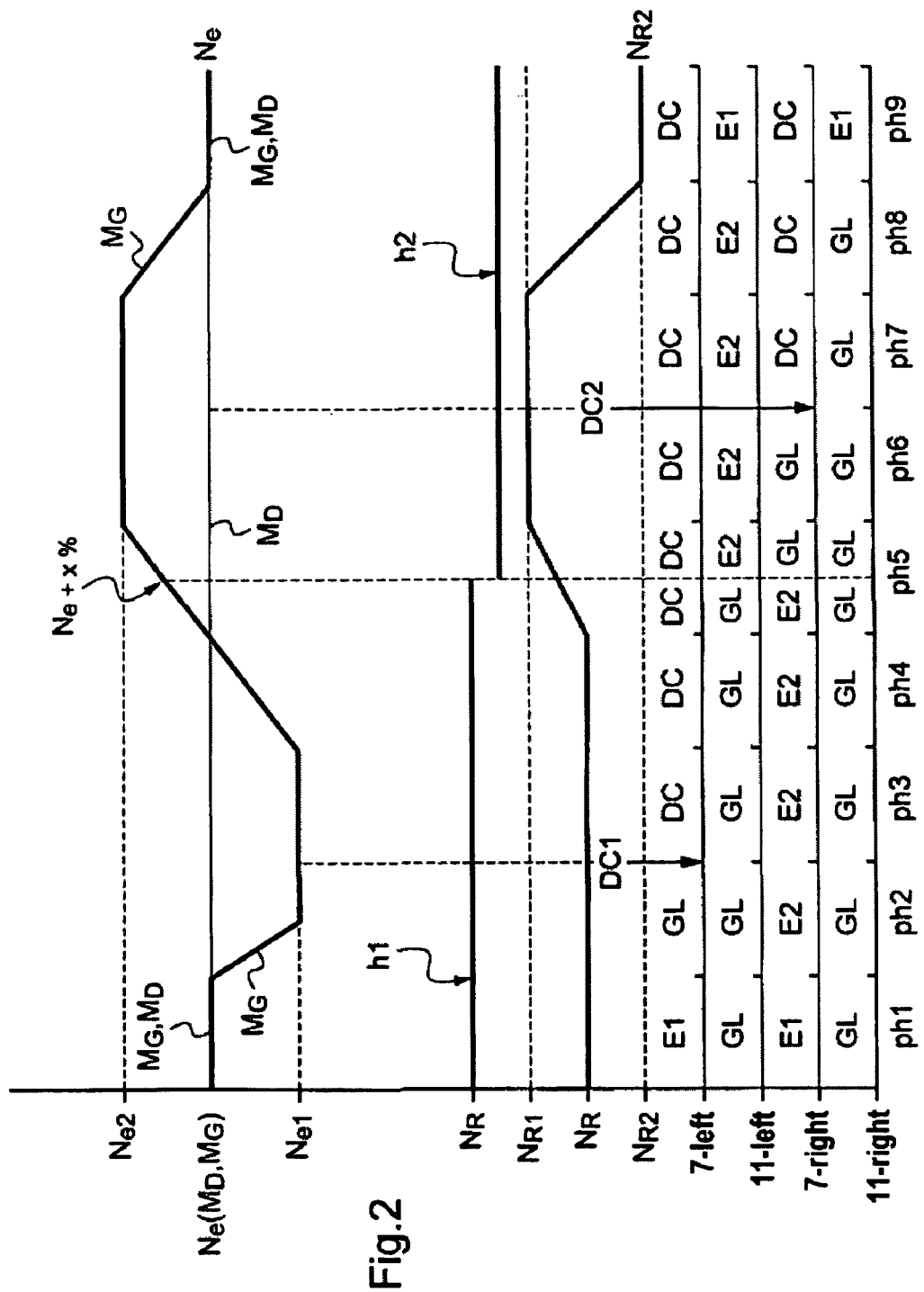
FIG. 2 is a diagram showing firstly the various phases of the control method in accordance with the invention for changing the speed of rotation of the main shaft of a power transmission gearbox in accordance with the invention, and secondly the various operating states of the freewheels in each transmission system during said phases.

The operating states of the freewheels during phases ph1 to ph9 remain unchanged compared with the implementation shown in FIG. 2. In contrast, the speed of rotation Nr of the rotor is not momentarily increased during the change of speed implemented by this implementation variant of the control member in accordance with the invention. This may present advantages, e.g. for the power transmission gearbox of a helicopter, under particular flight or operating conditions.

The successive steps described above in this variant implementation of the control method can likewise be implemented in the opposite order, without going beyond the ambit of the present invention, so as to return the rotor to its initial speed Nr.

Which implementation of the control method in accordance with the invention is to be performed is advantageously determined by a computer.

It is possible to envisage a generalization in the design of gearboxes in accordance with the invention. In this generalization, each transmission system has n reduction stages, a simple freewheel 11, a main freewheel $\bar{1}3$, and n−1 declutchable freewheels 11, where n is an integer greater than or equal to 2 and corresponds to the number of available outlet speeds.

To have a gearbox with two available speeds, each transmission system thus has one declutchable freewheel, one simple freewheel, and one main freewheel, as shown in FIG. 1.

With the same number of engines, it is thus possible to increase the number of available speeds by increasing the number of reduction stages (4).

In another embodiment in accordance with the invention, it is possible to use three engines to provide three transmission systems while conserving two available outlet speeds. The number of engines used does not determine the number of available speeds.

By way of example, for n equal to 3, the gearbox has two reduction stages, one simple freewheel 11, one main freewheel 13, and two declutchable freewheels 7. Such a gearbox gives access to three different speeds of rotation for the rotor, while the engine members MG and MD operate at the same speed of rotation.

In addition, passing from one speed of rotation to another in accordance with the invention does not lead to a loss of power transmission to the rotor.

The present invention can be implemented with engines or groups of engines constituted by turbine engines, and also with piston engines.

What is claimed is:

1. A power transmission gearbox for rotorcraft for transmitting rotary movement from at least two engine members (MG, MD) to a main shaft (1) with determined reduction ratios, wherein the gearbox presents at least two transmission systems (G, D) for imparting rotary movement to the main shaft (1), each of the transmission systems comprising:
   an inlet shaft (3) designed to be driven in rotation by an engine member (MG, MD);
   at least two reduction stages (4, 5) presenting different reduction ratios (k2, k1);
   a first gearwheel (6) connected to the inlet shaft (3) via a declutchable freewheel (7), said gearwheel (6) meshing with a first toothed wheel (8) secured to an intermediate shaft (9), thereby defining at least a first reduction stage (4);
   a second gearwheel (10) connected to the inlet shaft (3) via a simple freewheel (11), said second gearwheel (10) meshing with a second toothed wheel (12) secured to the intermediate shaft (9), thereby defining the second reduction stage (5);
   a main freewheel (13) mounted on the intermediate shaft (9) to rotate a complementary toothed wheel (14) secured to the main shaft (1); and
   a clutch mechanism for the declutchable freewheel (7) for the purpose, depending on circumstances, of putting the inlet shaft (3) into engagement with said declutchable freewheel (7) or for drivingly isolating the inlet shaft (3) from said declutchable freewheel (7).

2. A power transmission gearbox according to claim 1, wherein the clutch mechanism is mounted on the inlet shaft (3).

3. A power transmission gearbox according to claim 1, wherein the clutch mechanism is actuated via a hydraulic actuator (15).

4. A power transmission gearbox according to claim 3, wherein the clutch mechanism comprises a mechanism for engaging and disengaging the inlet shaft (3) with an outlet shaft that is coaxial with the inlet shaft over at least a portion of its length.

5. A power transmission gearbox according to claim 1, wherein the main shaft (1) is designed to drive a rotary wing or at least one rotor, e.g. carrying blades (2).

6. A power transmission gearbox according to claim 1, wherein each transmission system has n reduction stages, one simple freewheel (11), one main freewheel (13), and n−1 declutchable freewheels (7), where n is the number of available speeds, i.e. an integer greater than or equal to 2.

7. A control method for modifying the speed of rotation of a main shaft of a power transmission gearbox in accordance with claim 1, wherein the method consists in:
- j1) reducing the speed of rotation of the left engine member (MG) to a value Ne1, starting from a value Ne, while conserving the value Ne for the speed of rotation of the right engine member (MD);
- j2) declutching the declutchable freewheel (7) of the left transmission system (G);
- j3) increasing the speed of rotation of the left engine member (MG) to the value Ne and keeping said speed of rotation constant;
- j4) decreasing the speed of rotation of the right engine member (MD) to a value less than Ne, e.g. equal to Ne1;
- j5) declutching the declutchable freewheel (7) of the right transmission system (D); and
- j6) increasing the speed of rotation of the right engine member (MD) to the value Ne.

8. A control method according to claim 7, consisting in implementing steps j1) to j6) or i1) to i5) with the help of a computer.

9. A control method for modifying the speed of rotation of a main shaft of a power transmission gearbox in accordance with claim 1, wherein the method consists in:
- i1) reducing the speed of rotation of the left engine member (MG) to a value Ne1, starting from a value Ne, while conserving the value Ne for the speed of rotation of the right engine member (MD);
- i2) declutching the declutchable freewheel (7) of the left transmission system (G);
- i3) increasing the speed of rotation of the left engine member (MG) to a value Ne2, greater than the value Ne;
- i4) declutching the declutchable freewheel (7) of the right transmission system (D); and
- i5) decreasing the speed of rotation of the left engine member (MG) to the value Ne.

10. A motor assembly for a rotorcraft of the helicopter kind, the assembly comprising a main transmission gearbox in accordance with claim 1 and a respective engine member (MG, MD) of the turbine engine or piston engine kind associated with each of the transmission systems.

11. A helicopter or a rotorcraft including an engine assembly according to claim 10.

12. A helicopter or a rotorcraft including a power transmission gearbox in accordance with claim 1.

* * * * *